United States Patent [19]

Shinonaga

[11] Patent Number: 5,056,055
[45] Date of Patent: Oct. 8, 1991

[54] COHERENT SURFACE ACOUSTIC WAVE UNIQUE WORD DETECTOR

[75] Inventor: Hideyuki Shinonaga, Saitama, Japan

[73] Assignee: Kokusai Denshin Denwa Co., Ltd, Tokyo, Japan

[21] Appl. No.: 400,297

[22] Filed: Aug. 29, 1989

[30] Foreign Application Priority Data

Sep. 7, 1988 [JP] Japan ................. 63-222274

[51] Int. Cl.$^5$ ............................. G06G 7/12
[52] U.S. Cl. .................... 364/821; 333/193; 310/313 R
[58] Field of Search ............ 364/821, 724.11; 310/313 R, 313 B; 333/195, 24 R, 150, 30 R, 193, 194, 196

[56] References Cited

U.S. PATENT DOCUMENTS

| | | | |
|---|---|---|---|
| 4,070,638 | 1/1978 | Reeder | 364/821 |
| 4,096,477 | 6/1978 | Epstein et al. | 333/30 R |
| 4,169,286 | 9/1979 | Uzunoglu et al. | 364/821 |
| 4,224,683 | 9/1980 | Adkins | 364/821 |
| 4,418,393 | 11/1983 | Zscheile, Jr. | 364/724.11 |
| 4,485,363 | 11/1984 | Hunsinger et al. | 364/821 |
| 4,506,239 | 3/1985 | Cho et al. | 364/821 |
| 4,635,221 | 1/1987 | Kerr | 364/821 |
| 4,661,923 | 4/1987 | Grudkowski et al. | 364/821 |
| 4,799,184 | 1/1989 | Grassl | 364/821 |

OTHER PUBLICATIONS

"Unique Word Detection in Digital Burst Communications", IEEE Transactions on Communication Technology, vol. COM-16, No. 4, Aug. 1968, pp. 597-605.
"Phase Ambiguity Resolution in a Four-Phase PSK Communications System", IEEE Transactions on Communication Technology, vol. COM-19, No. 6, Dec. 1971, pp. 1200-1210.

Primary Examiner—Jerry Smith
Assistant Examiner—Jim Trammell
Attorney, Agent, or Firm—Armstrong, Nikaido, Marmelstein, Kubovcik, & Murray

[57] ABSTRACT

A unique word in a digital communication system is detected on a receiving side by using an acoustic surface wave matched filter (4) having a piezoelectric substrate, an input interdigital electrode (4c) and and output interdigital electrode (4a, 4b) on the substrate. An input signal is applied to the input interdigital electrode in the form of a phase modulated IF band signal. A pattern of the output interdigital electrode is designed depending upon a unique word to be detected where data 1 corresponds to an upper finger (4a) followed by a lower finger (4b), data 0 corresponds to a lower finger (4b) followed by an upper finger (4a) or vice versa, and progapation time of the surface acoustic wave over the spacing (d) between each pairs of fingers (4a, 4b) is equal to a bit time duration of the unique word. An output of the acoustic surface wave matched filter is coherently detected, and when absolute value of the coherent detection exceeds a predetermined value, a unique word is recognized and the received phase in the demodulator is determined at the same time.

9 Claims, 5 Drawing Sheets

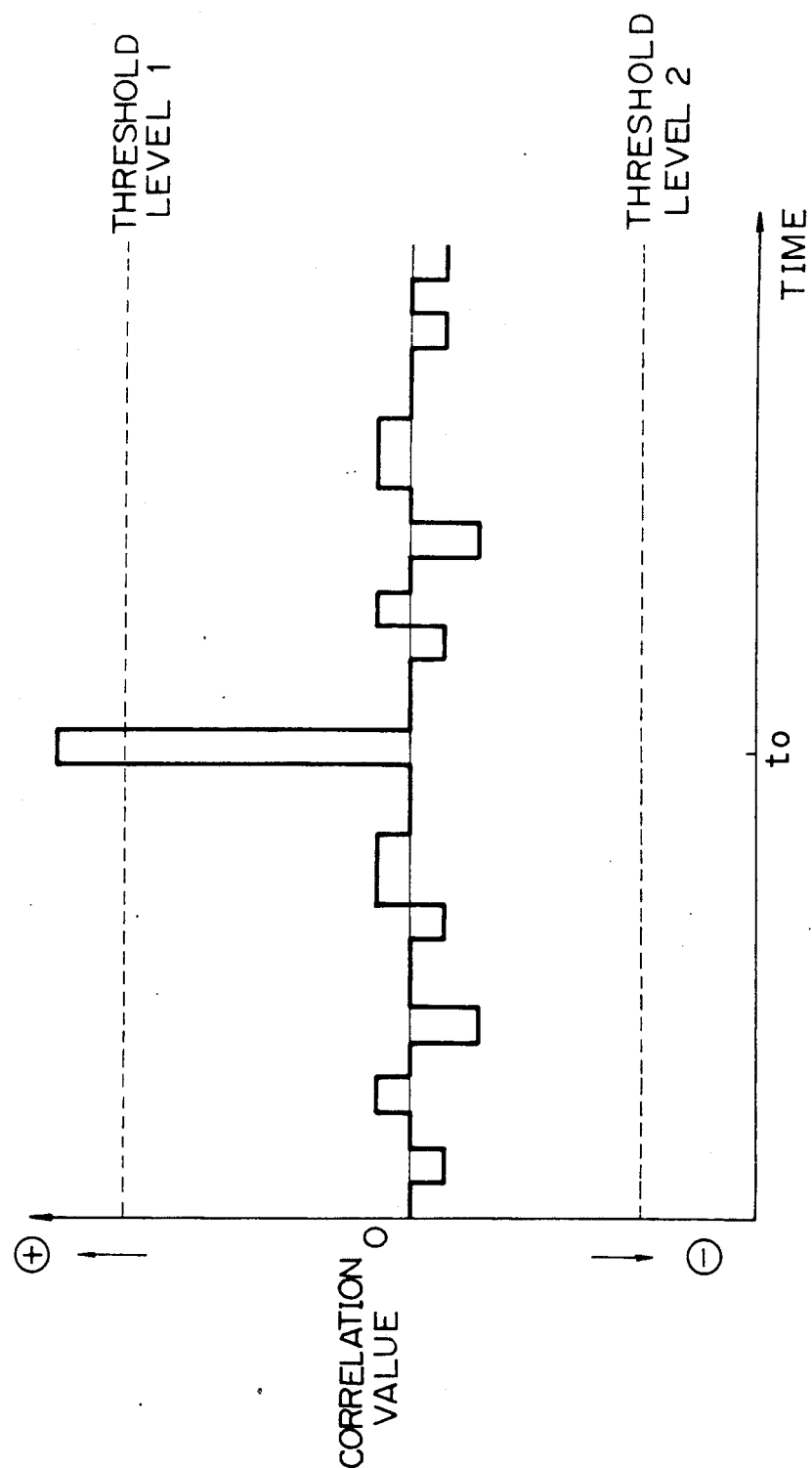

COHERENT SURFACE ACOUSTIC WAVE UNIQUE WORD DETECTOR

BACKGROUND OF THE INVENTION

The present invention relates to a unique word detecting system for detecting a unique word used in a digital communication system.

Conventionally, unique words have been widely used for the establishment and maintenance of the synchronization, received phase ambiguity removal, signal type recognition, and the like in digital communication systems. A variety of modulation and demodulation systems such as phase modulation, frequency modulation, amplitude modulation, and the like, have been used.

A unique word detector used in the conventional digital communication system is shown in FIG. 4. In FIG. 4, a reference numeral 1 designates a shift register, 2 is a digital correlator including a unique word pattern memory 21 for storing a predetermined unique word pattern, N number of exclusive OR circuits $22_a$–$22_n$ and (N−1) number of adders $23_a$–$23_{n-1}$, and 6 is a threshold judgment circuit, all of which constitute the unique word detector 10. The length of the shift register 1 is equal to a unique word length. The operation of the unique word detector 10 shown in FIG. 4 will be described below. Baseband data is input to the shift register 1. The shift register 1 is input with a new piece of data at every clock time and shifts the old data to the right by one bit. As a result, the oldest data is deleted. The whole data in the shift register 1 is input to the digital correlator 2 in parallel at every clock time, compared with the unique word pattern in the unique word pattern memory 21 at every bit by the exclusive OR circuits $22_a$–$22_n$, and a correlation value R is calculated by the adders $23_a$–$23_{n-1}$.

When the data in the shift register 1 are $a_0, a_1, a_2, \ldots, a_{N-1}$ and the unique word patterns are $u_0, u_1, u_2, u_3, \ldots, u_{n-1}$, the correlation value R is defined by $$R = \sum_{i=0}^{N-1} a_i \oplus u_i$$

where $a_i$ and $u_i$ ($i=0, 1, 2, \ldots, N-1$) take the values of 0 or 1, and a symbol $\oplus$ means an exclusive OR, which takes the value of 0 when $a_i$ and $u_i$ coincide with each other and takes the value of 1 when they do not coincide. That is, the correlation value R is equal to the number of the bits at which the data in the shift register 1 disagree with the unique word pattern.

Such a correlation value is normally called Hamming distance.

Another definition of the correlation value is a difference between the number of the bits at which the data in the shift register 1 agree with the unique word pattern and that of the bits at which the data in the shift register 1 do not agree with the unique word pattern. By this definition, the correlation value takes positive or negative values. A description will be made by using the correlation value of the latter definition. A difference between the two definitions is not essential and has no concern with unique word detecting characteristics.

The unique word is detected through the threshold determination of a correlation value produced at every clock time. In the system adopting the demodulation system wherein the phase ambiguity is generated, the received phase in the demodulator is determined at the same time as the detection of the unique word. Accordingly, a case wherein the received phase is determined at the same time as the detection of the unique word is exemplified and the description will be made below on this case.

FIG. 5 shows an example of the correlation value output obtained when the conventional unique word detector 10 is used. The correlation value R exceeds a threshold level 1 at time $t_0$ and it is determined that the unique word is detected at this time $t_0$. Further, the received phase is determined by observing whether the correlation value R exceeds the positive threshold level 1 or the negative threshold level 2.

In a multiphase or multilevel modulation system such as a multiphase modulation system (for example, a quadrature phase shift keyed system) or a multilevel QAM (Quadrature Amplitude Modulation) system, information transmitted by one transmission symbol is more than two bits. In such a system, the unique word detection is often performed by a plurality of the shift registers 1 and the digital correlators 2 shown in FIG. 4. At this case, a plurality of information bits demodulated from the single transmission symbol are input to a plurality of the shift registers 1 in parallel and a plurality of the correlation values R are calculated at every clock. The unique word is detected by threshold-judging a plurality of the correlation values obtained by further conducting a linear operation on a plurality of the correlation values R.

There exist, however, the following problems in the above-described conventional constitutions:

The unique word detector 10 is required to complete a series of processing up to a threshold determination within one clock time duration including comparison of the data in the shift register 1 and the unique word pattern with each other at every bit to obtain the correlation value R. That is, the unique word detector 10 must process N number of exclusive OR operations, (N−1) number of additions and one threshold determination within one clock time duration. Therefore, the unique word detector 10 is required to operate at an extremely high speed as compared with other parts of a digital communication apparatus.

When the multiphase or multilevel modulation system is employed, the entire processing, including the linear operation of a plurality of the correlation values, must be executed within one clock time duration. Accordingly, the circuitry of the unique word detector 10 must be constituted by high speed logic gates such as ECL's or the like, and has the problem that both power consumption and amount of generated heat are large. In addition, there is the further problem that the whole circuit scale is very large because the (N−1) number of adders $23_a$–$23_{n-1}$ for performing the additions of the exclusive OR operations at every bit is also very large.

When LSI's are used to constitute the unique word detector 10 for the high bit rate system, the power consumption of the LSI's increases, resulting in the serious problem of a large heat generation. In addition, there is the problem that the conversion of the circuitry to an LSI constitution is difficult when a bit rate is higher than some value, unless parallel processing is performed and that the circuit scale is enlarged when the parallel processing is performed.

SUMMARY OF THE INVENTION

It is an object, therefore, to overcome the disadvantages and limitations of a unique word detection system by providing a new and improved unique word detection system.

It is also an object of the present invention to provide a unique word detection system which is small in size, low in power consumption, and low in heat generation, while at the same time suitable for high speed operation.

The above and other objects are attained by a unique word detection system comprising; an acoustic surface wave matched filter having a piezoelectric substrate, a first interdigital electrode disposed on the substrate, and a second interdigital electrode disposed on the substrate wherein a pattern of the second interdigital electrode is determined depending upon a unique word to be detected; an input device for applying an input signal which is phase modulated in an IF band to the first interdigital electrode; an output device coupled with the second interdigital electrode which coherently detects an output signal of the second interdigital electrode; and a device for recognizing a unique word and the received phase in the demodulator coupled with the output device when absolute value of level of the output device exceeds a predetermined value.

In one embodiment, a plurality of acoustic surface wave matched filters are used for detecting a unique word in a multiphase or multilevel signal.

BRIEF DESCRIPTION OF THE DRAWINGS

The foregoing and other objects, features, and attendant advantages of the present invention will be appreciated as the same become better understood by means of the following description and accompanying drawings wherein;

FIG. 5 shows the curve showing the operation of the prior unique word detection system of FIG. 4.

DESCRIPTION OF THE PREFERRED EMBODIMENTS

Figure 1:
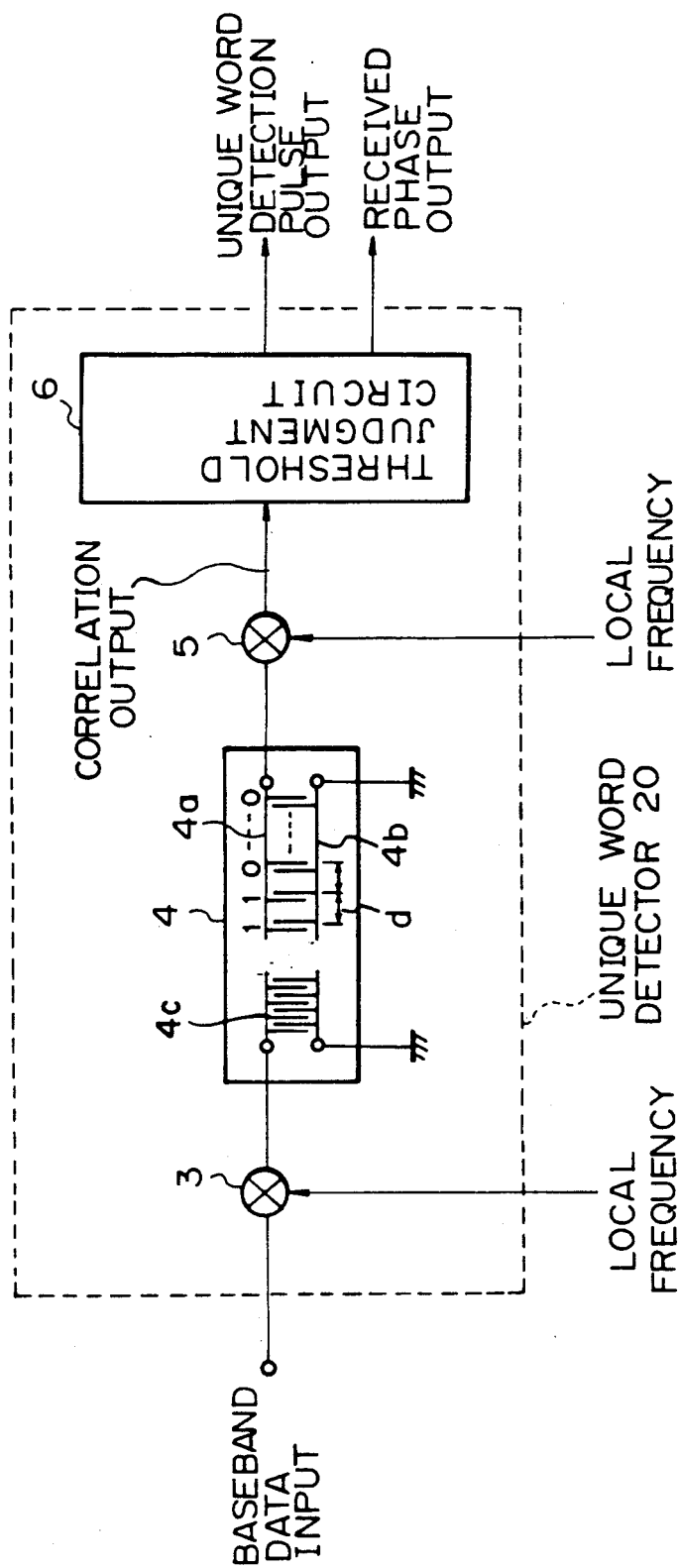
FIG. 1 is a block diagram of a unique word detection system according to the present invention.

FIG. 1 shows the structure of a unique word detector 20 that is a first embodiment according to the present invention.

In FIG. 1, a reference numeral 3 designates a mixer (first converting means) for converting an input baseband signal to a binary phase shift keyed signal in an IF (intermediate frequency) band, 4 is an acoustic surface wave matched filter matched with the phase-modulated signal wave by the unique word pattern, 5 is another mixer (second converting means) for converting the output of the acoustic surface wave matched filter to a baseband signal and 6 is the threshold judgment circuit for threshold-judging the correlation value that is an output signal from the mixer 5 to detect the unique word and determine the received phase in the demodulator.

The acoustic surface wave matched filter 4 has a structure wherein interdigital electrodes on the input and output sides are arranged on a piezoelectric substrate. An input electric signal is converted into an acoustic surface wave by the input side interdigital electrode (4c) and the acoustic surface wave is converted into the electric signal by the output side interdigital electrode (4a, 4b) to be output. At this time, by arranging the electrode fingers of the output interdigital electrode (4a, 4b) so as to correspond to the unique word, a high level output signal can be generated when the unique word is detected. The relation between the arrangement of the electrode fingers and the unique word is so made such that, for example, a pattern wherein an upper finger 4a (see FIG. 1) precedes and a lower finger 4b follows the upper finger 4a along the propagating direction of the surface wave is made to correspond to information 1, and conversely a pattern wherein the lower finger 4b precedes and the upper finger 4a follows the lower finger 4b is made to correspond to information 0 or vice versa.

Propagation time of the acoustic surface wave over the space (d) between a pair of the upper and lower fingers 4a and 4b, respectively, is equal to the bit time duration of the unique word. In the embodiment shown in FIG. 1, the pattern of the unique word is represented by (0 . . . 011).

Since the output signal is produced also for the anti-phase pattern (the pattern of 1 . . . 100 in contrast with 0 . . . 011) to the unique word as the properties of the acoustic surface wave matched filter, it is required to coherently detect the output signal in order to determine the received phase in the demodulator in order to remove the ambiguity of the received phase as described below. That is, in the absolute phase modulation system of the present invention, a transmitter sends an output pattern (unique word), but a receiver detects either the unique word or an anti-phase pattern because of the phase ambiguity depending upon the carrier phase of the transmitter and receiver. The present invention determines whether the unique word or anti-phase pattern is detected.

In operation, the input baseband data is inputted to the mixer 3. The mixer 3 is supplied with an IF band local frequency, and the input data is modulated to a binary phase shift keyed signal. Then, the phase modulated wave by the input baseband data is input to the acoustic surface wave matched filter 4. When input with an IF band signal wave that is phase modulated by the unique word pattern, the acoustic surface wave matched filter 4 outputs a sharp peak signal in correspondence with the correlation value. That is, the present invention utilizes the above-described characteristics of the acoustic surface wave matched filter 4. However, since the output signal of the acoustic surface wave matched filter 4 is of a local frequency signal, namely, the IF band signal, the output signal is input to the mixer 5 and is converted to the baseband signal by the coherent detection using the same local frequency as the one supplied to the mixer 3. That is, the phase ambiguity generated during an absolute phase demodulation is resolved by separating the unique word and anti-phase pattern using the coherent detection of the output of the filter 4 with the local frequency which is coherent with the local frequency used in the input mixer 3. The converted baseband signal is threshold-judged by the threshold judgment circuit 6 and, when a predetermined threshold is exceeded, generates a unique word detection pulse. At the same time, the received phase is also determined.

The phase of the local frequency to the mixer 5 is adjusted so as to be the same as that of the output signal of the acoustic surface wave matched filter 4. When the local frequency, an image signal or the like leaks from the mixer 5, an amplifier or a filter with low-pass characteristics is required on the output side of the mixer 5 to prevent a leakage. However, the selection of the suitable frequency characteristics of the mixer 5 enables the leakage of the above-mentioned signal to be removed and then neither amplifier nor filter is required. The amplifier for a level adjustment, however, is often required.

Figure 2:
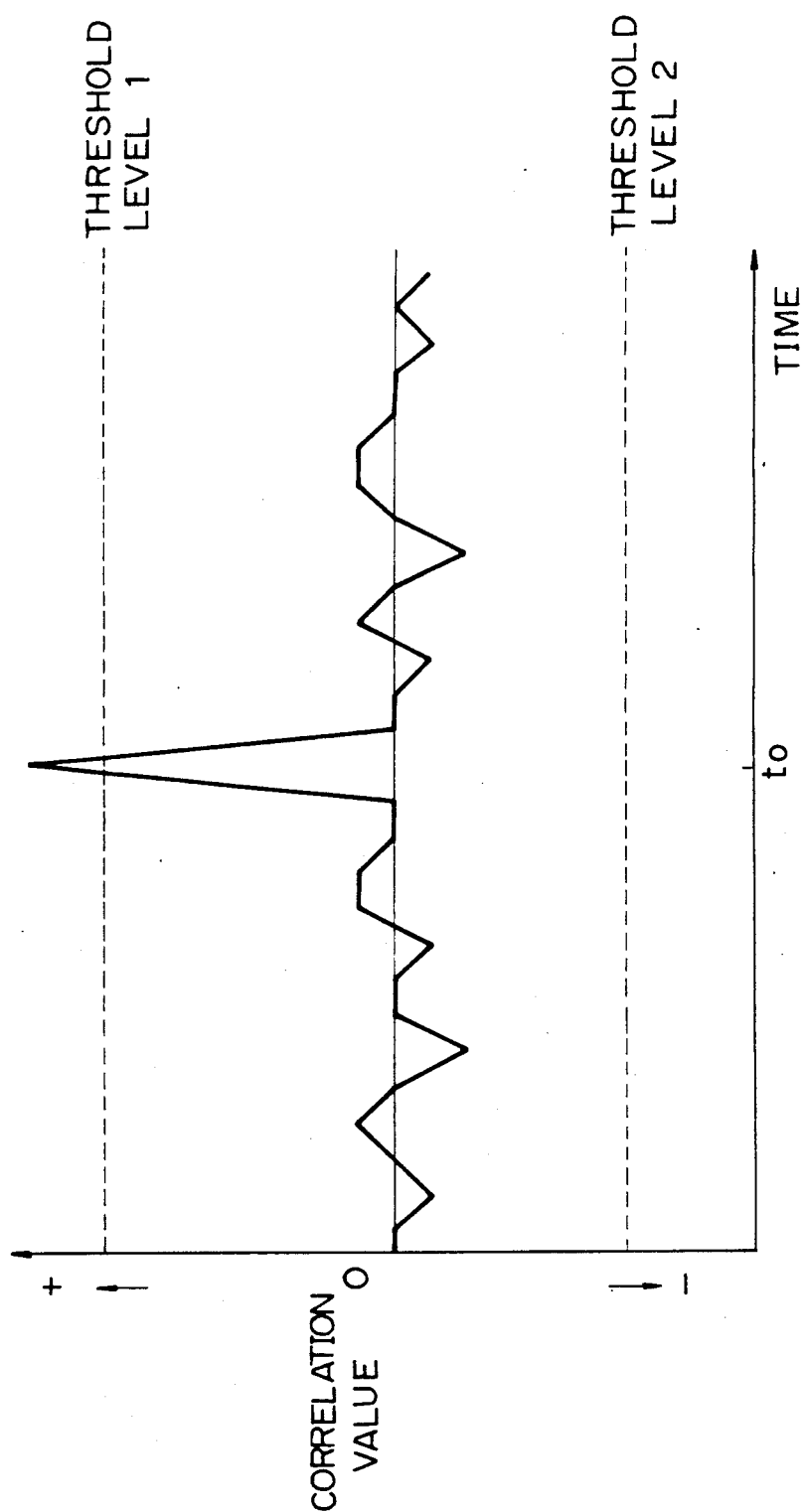
FIG. 2 shows the curve showing the operation of the unique word detection system of FIG. 1.

FIG. 2 shows an example of the correlation value output, the output signal of the mixer 5, in the unique word detector 20 according to the present invention. In FIG. 2, since the correlation value output exceeds the threshold level 1 at time $t_0$, the threshold judgment circuit 6 determines the presence of the unique word.

The received phase in the demodulator is recognized by whether the positive threshold value (level 1, i.e., unique word detected) or the negative threshold value (level 2, i.e., anti-phase pattern detected) is exceeded.

When the anti-phase pattern of the unique word is confirmed to be received, 1 and 0 are thereafter inverted to each other in information bits. Thus, the ambiguity of the received phase in the demodulator is removed.

FIG. 2 corresponds to FIG. 5 showing the correlation value output of the conventional unique word detector 10. The comparison between FIGS. 2 and 5 reveals that a curve representing the correlation value output of the mixer 5 in the unique word detector 20 according to the present invention is equal to a polygonal line connecting the correlation values R at the center clock timing of the conventional unique word detector 10. Therefore, unique word detection characteristics are quite the same as the conventional characteristics.

The unique word detector 20 according to the present invention has the following features as compared with the conventional unique word detector 10: Since the correlation value R is obtained by the acoustic surface wave matched filter 4, which is the small size passive element, the circuit scale is substantially smaller than the conventional circuit scale and, since no high speed logic gate is used, the power consumption and the heat generation are also small. Further, the acoustic surface wave matched filter 4 is also suitable for high speed data and accompanies no increase in power consumption and heat generation for high speed operation. Accordingly, the filter 4 is more advantageous than the LSI for the high bit rate system. While the local frequency for the unique word detector 20 according to the present invention may be supplied by a dedicated frequency source, the employment of the local frequency already existing in other part of the digital communication system as it is, frequency divided or multiplied, can reduce the whole circuit scale.

As the unique word detector 20, an example is described above wherein the input signal to the acoustic surface wave matched filter 4 is phase modulated using the mixer 3, and an acoustic surface wave matched filter output signal is converted to the baseband signal using the mixer 5. The mixers 3 and 5, however, are not necessarily required as the first and second converting means, respectively. For example, in the digital communication system using the binary phase modulation, the received signal wave is generally frequency-converted to the IF (intermediate frequency) band by a frequency converter and demodulated by a two-phase demodulator on a receiving side. Therefore, when the signal wave that is frequency-converted to the IF band is directly input to the acoustic surface wave matched filter 4, the unique word detector 20 can be constituted without using the mixer 3. In this case, an IF band carrier recovered by the two-phase demodulator may be used as the local frequency to be supplied to the mixer 5 for coherently detecting the output signal of the acoustic surface wave matched filter 4. Further, when the removal of the ambiguity of the received phase in the demodulator is not required by using a differential coding or the like, the detection of the output of the acoustic surface wave matched filter 4 by directly using a detector and threshold-judging a detector output is possible without using the mixer 5. That is, the input signal to the acoustic surface wave filter 4, which is the feature of the present invention, and further the output signal therefrom, has only to be the phase modulated signal wave.

Figure 3:
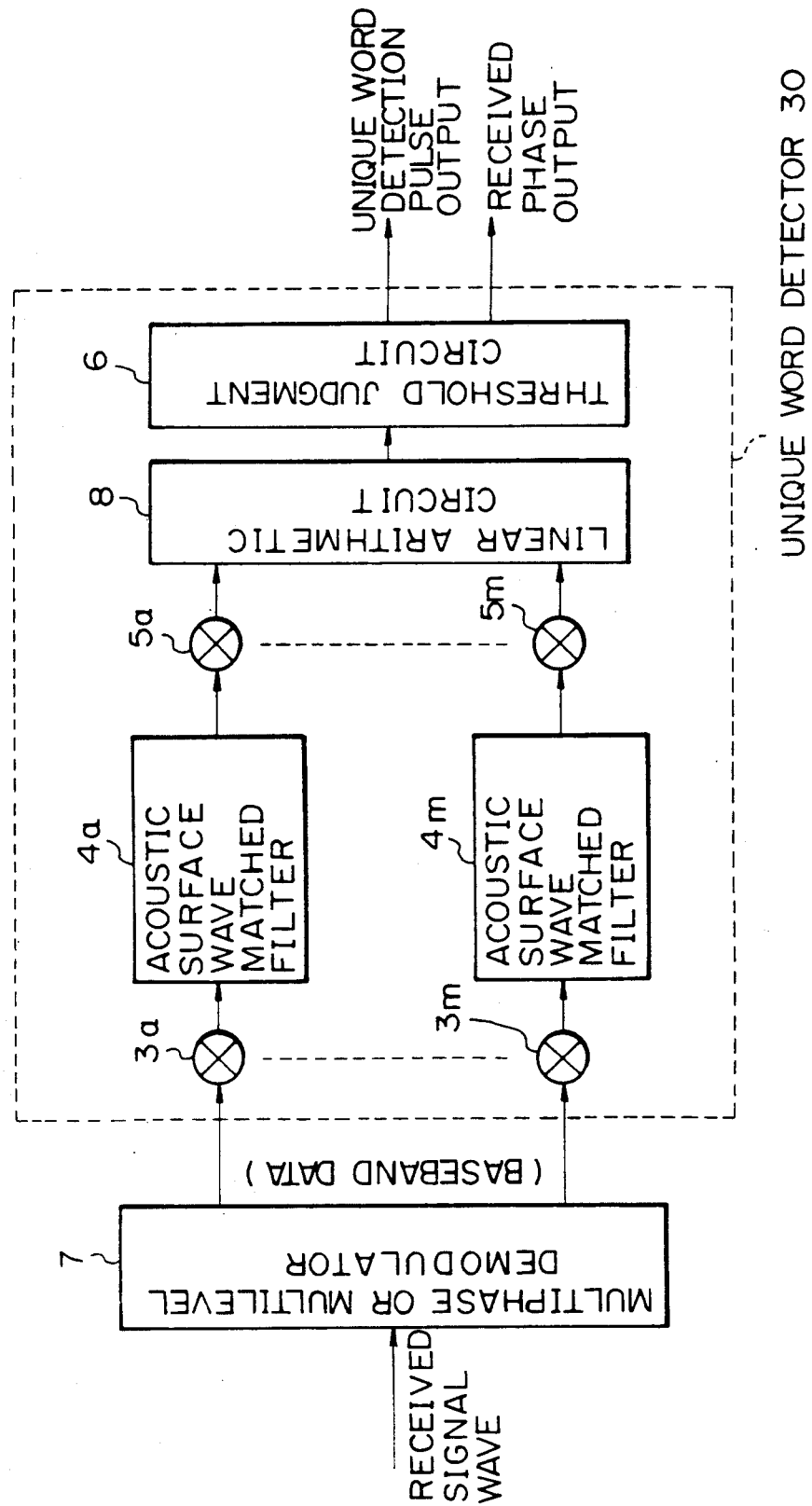
FIG. 3 is a block diagram of another embodiment of a unique word detection system according to the present invention.
Figure 4:
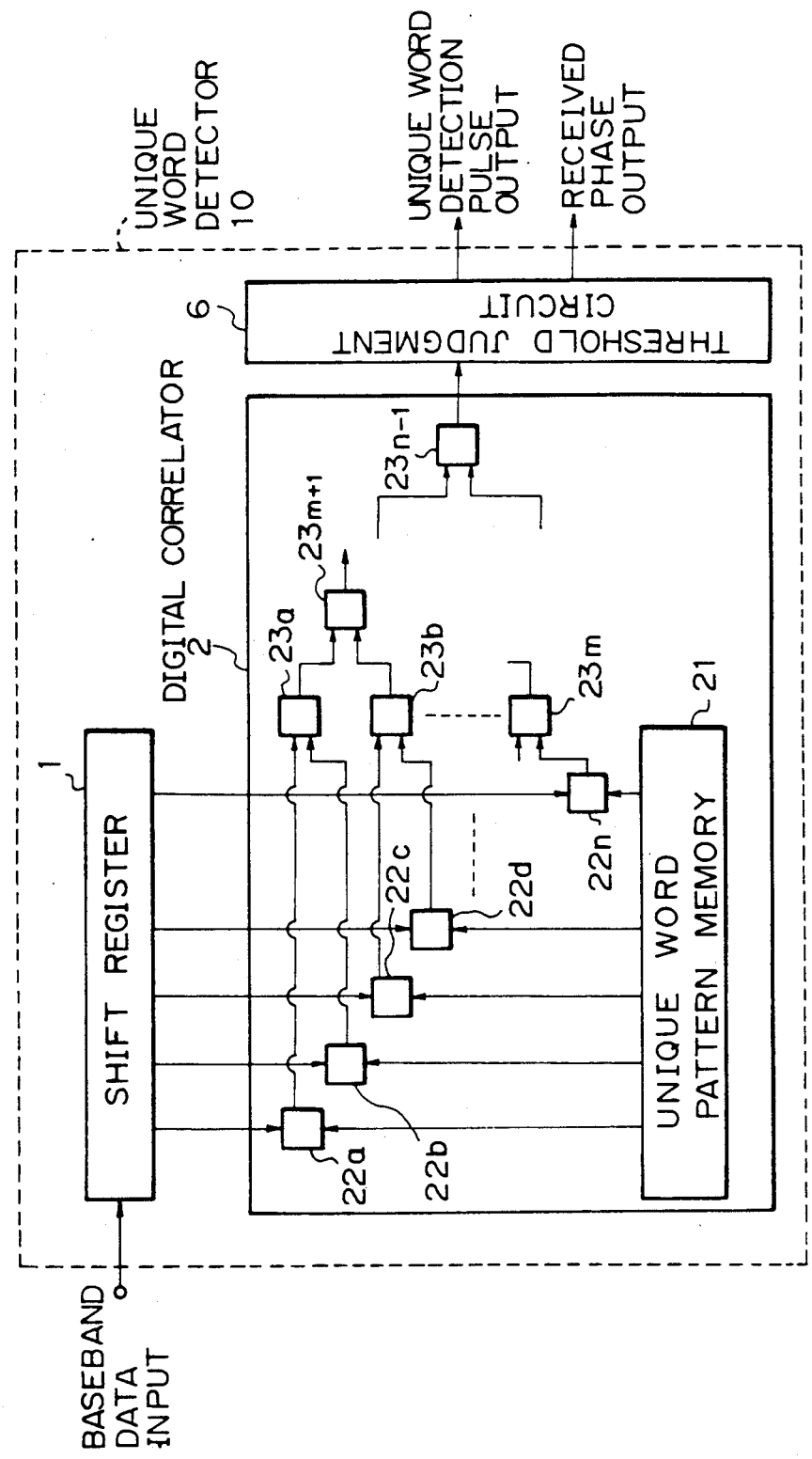
FIG. 4 is a block diagram of a prior unique word detection system.

FIG. 3 shows a second embodiment according to the present invention and illustrates the structure of the unique word detector 30 wherein the multiphase or multilevel modulation system is adopted.

In FIG. 3, a reference numeral 7 designates a multiphase or multilevel demodulator with M phases or M levels, and 8 is the linear arithmetic circuit for performing the linear operation on the correlation values. To the linear arithmetic circuit 8, (m) number of first converting circuits 3, the (m) number of acoustic surface wave matched filters 4 and (m) number of second converting circuits 5 are connected. Others are the same as the embodiment 1 and are constituted such that a unique word detection and a received determination can be performed.

In FIG. 3, since the baseband data is input into a plurality of branch paths (a–m), and therefore the unique word is also input into the plurality of branch paths, the correlation values for the partial patterns of the unique word in the branch paths (a–m) are detected by the acoustic surface wave matched filters $4a$–$4m$, respectively. The detected correlation values for the partial patterns are combined into the correlation value for the unique word by the linear arithmetic circuit 8.

The mixer 3 for phase modulation of parallel data from the multiphase or multilevel demodulator 7 is required. On the other hand, when only the unique word is required to be detected, the linear operation is conducted on the output signals of a plurality of the acoustic surface wave matched filters 4 in the IF band by the linear arithmetic circuit 8, thereafter the detection is conducted by using the detector, and the detector output is threshold determined. In that case, the unique word detector 30 can be constituted without using the mixer 5. However, since the ambiguity of the received phase in the multiphase demodulator can not be removed in that case, a phase ambiguity is required to be removed by the other means such as differential coding or the like.

As described above, the present invention enables the unique word detectors 20 and 30 to be constituted which can considerably reduce the circuit scale, the power consumption and the heat generation as compared with a conventional unique word detector using a digital correlator 2. The unique word detector according to the present invention is more advantageous than an LSI constitution in the high bit rate system. Accordingly, the unique word detector according to the present invention is suitable not only for ground systems but also for communication satellites.

As described above, since the unique word detectors 20 and 30 are constituted using the acoustic surface wave matched filters 4, the small size passive elements, in the present invention, the smaller size unique word detectors 20 and 30 with the smaller circuit scale than that of the conventional one are realized. Further, since high speed gate is not used, the power consumption and the heat generation are small. Still further, since the acoustic surface wave matched filter 4 is suitable also for the high bit rate system, the filter 4 is more advantageous than the LSI.

By using the mixer 3 as the first converting means, a frequency conversion to the IF band and the phase modulation of the input baseband signal can be performed at the same time.

The unique word detector according to the present invention can also be adapted for a receiving system by using a frequency converter as the first converting means.

By arranging the second converting means for converting the IF band signal to the baseband signal on the poststage of the acoustic surface wave matched filter 4, the unique word detector according to the present invention can also perform the received phase determination in addition to the unique word detection.

By providing the (m) number of first converting means, the (m) number of acoustic surface wave matched filters 4a–4m matched with the IF band signal wave which is phase modulated by the partial unique word pattern and the linear arithmetic circuit 8 for conducting the linear operation on a plurality of the correlation values obtained by a plurality of the acoustic surface wave matched filters 4a–4m, the unique word detecting system according to the present invention can be simply applied also to the system adopting the multiphase or multilevel modulation system.

Therefore, the unique word detector according to the present invention being a small sized, light-weight and low power consuming unique word detector is suitable not only for ground systems, but also for communication satellites.

From the foregoing, it will now be apparent that a new and improved unique word detection system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A unique word detector in an absolute phase-shift keyed system, wherein a coherent phase demodulator is used which outputs a correct data stream or an inverted data stream of the correct data stream in accordance with a recovered phase in a coherent phase demodulator, said unique word detector comprising:

a first mixer, to which baseband data stream output from said coherent phase demodulator and a local frequency from a local oscillator are supplied, for binary-phase-shift keying said baseband data stream;

a surface acoustic was matched filter, coupled with said first mixer, having a) a piezoelectric substrate, b) a first interdigital electrode disposed on said substrate to which binary-phase-shift keyed signal by said baseband data stream is applied from said first mixer, and c) said second interdigital electrode disposed on said substrate wherein a relationship thereof is so designed as to provide a maximum envelope output in response to a predetermined unique word pattern of absolute phase coding;

a second mixer, coupled with said second interdigital electrode, to which a local frequency from said local oscillator is supplied, for coherently detecting an output signal of said surface acoustic wave matched filter; and determining means, coupled with said second mixer, for detecting a unique word and determining a recovered phase in said coherent phase demodulator, wherein a unique word detection pulse is output when an absolute value of the output signal of said second mixer exceeds a predetermined value, and at the same time, recovered phase information is determined and output in accordance with a polarity of the output signal of said second mixer.

2. A unique word detection system according to claim 1, wherein said input means comprises a conversion means, which is supplied with the local frequency, to convert input baseband data to said binary shift keyed IF band signal.

3. A unique word detection system according to claim 1, wherein said input means is a frequency converter which is a part of a receiver.

4. A unique word detection system in a digital communication system comprising:

an acoustic surface wave matched filter having a piezoelectric substrate, a first interdigital electrode disposed on said substrate, and a second interdigital electrode disposed on said substrate wherein a pattern of said second interdigital electrode is based upon a unique word to be detected;

an input means for applying an input signal, which is binary phase modulated in an IF band, to said first interdigital electrode;

an output means coupled with said second interdigital electrode, said output means for coherently detecting an output signal of said second interdigital electrode; and determining means for recognizing a unique word based on an output of said second interdigital electrode exceeding a predetermined value and recognizing a received phase based on a polarity of an output signal of said acoustic surface wave matched filter in a demodulator coupled with said output means.

5. A unique word detection system according to claim 4, wherein said input means comprises a conversion means, which is supplied a local frequency, to convert input baseband data to said binary phase modulated in said IF band signal.

6. A unique word detection system according to claim 4, wherein said input means is a frequency converter which is a part of a receiver.

7. A unique word detection system according to claim 4, wherein said input means and said output means are supplied with a common local frequency.

8. A unique word detector in an absolute multiphase-shift keyed system, in which one transmit symbol contains m (an integer more than or equal to two) bits, a coherent multiphase demodulator outputs m parallel baseband data streams or m channels through which partial patterns of a unique word are transmitted and a relationship between data streams of m channels at a transmitter and a receiver depends on a recovered phase in said coherent multiphase demodulator, said unique word detector comprising:

m number a first mixers, to which m parallel baseband data streams from said coherent multiphase demodulator and a same local frequency from a local oscillator are supplied, for binary-phase-shift keying said each of baseband data streams;

m number of surface acoustic wave matched filters, coupled with m numbers of said first mixers, each having a) a piezoelectric substrate, b) a first interdigital electrode disposed on said substrate to which binary-phase-shift keyed signal by said each of baseband data streams is applied from said each of first mixer, and c) said second interdigital electrode disposed on said substrate wherein a relationship thereof is so designed as to provide a maximum envelope output in response to each of predetermined partial patterns of a unique word of absolute phase coding;

m number of second mixers, each coupled with said m number of second interdigital electrodes, to which the same local frequency from said local oscillator is supplied for coherently detecting each of m output signals of said m number of surface acoustic wave matched filters; and determining means, coupled with said m number of second mixers, for determining the recovered phase in said coherent multiphase demodulator, wherein a plurality of correlation values are calculated by performing arithmetic operations on m number of output signals of m second mixers, a unique word detection pulse is output when an absolute value of one of said m correlation values exceeds predetermined values, and at the same time, recovered phase information is determined and output in accordance with type and polarity of said correlation value whose absolute value exceeds said predetermined value.

9. A unique word detection system according to claim 8, wherein an arithmetic means is coupled with outputs of said second mixers, said arithmetic means combines said baseband data streams.

* * * * *